(12) United States Patent
Porraro

(10) Patent No.: US 12,004,688 B2
(45) Date of Patent: Jun. 11, 2024

(54) COOKING APPARATUS

(71) Applicant: Matthew Porraro, Basking Ridge, NJ (US)

(72) Inventor: Matthew Porraro, Basking Ridge, NJ (US)

( * ) Notice: Subject to any disclaimer, the term of this patent is extended or adjusted under 35 U.S.C. 154(b) by 426 days.

(21) Appl. No.: 16/932,316

(22) Filed: Jul. 17, 2020

(65) Prior Publication Data

US 2021/0022552 A1 Jan. 28, 2021

Related U.S. Application Data

(60) Provisional application No. 62/876,899, filed on Jul. 22, 2019.

(51) Int. Cl.
*A47J 37/07* (2006.01)
*A47J 43/18* (2006.01)

(52) U.S. Cl.
CPC ........... *A47J 37/0786* (2013.01); *A47J 43/18* (2013.01)

(58) Field of Classification Search
None
See application file for complete search history.

(56) References Cited

U.S. PATENT DOCUMENTS

| 637,673 | A | 11/1899 | Scully |
| 714,657 | A | 12/1902 | Anderson |
| 1,007,477 | A | 10/1911 | Moscrip, Jr. |
| 2,882,812 | A | 4/1959 | Greenwald |
| 3,315,591 | A | 4/1967 | Elliott |
| 3,529,536 | A | 9/1970 | Milhem |
| 4,005,646 | A | 2/1977 | Krüper |
| 4,410,553 | A | 10/1983 | McGinty |
| 5,497,697 | A | 3/1996 | Promny |
| 5,560,286 | A | 10/1996 | Fabrikant et al. |
| 5,632,098 | A | 5/1997 | Finch |
| 5,740,724 | A | 4/1998 | Fabrikant et al. |
| 6,220,152 | B1 * | 4/2001 | Baldwin et al. ........ A47J 37/04 99/427 |
| 6,357,577 | B1 | 3/2002 | Bruke |
| 7,478,586 | B2 | 1/2009 | Gabrielle |

(Continued)

FOREIGN PATENT DOCUMENTS

| BR | 6802484 U | * | 8/1989 | ............. B65D 19/10 |
| CN | 109803565 A | * | 5/2019 | ............... A23L 5/17 |

(Continued)

OTHER PUBLICATIONS

Machine translation of WO 0165946 A1 performed on Sep. 14, 2022, Maerkl (Year: 2001).*

(Continued)

*Primary Examiner* — Dana Ross
*Assistant Examiner* — Kevin Guanhua Wen
(74) *Attorney, Agent, or Firm* — Greenberg Traurig, LLP

(57) ABSTRACT

A cooking apparatus including a container having a first end, a second end opposite the first end, a sidewall extending from the first end to the second end, an opening located that the first end, an end wall located at the second end, and a cap removably attached to the first end. The sidewall and the end wall form a compartment that is sized and shaped to receive food items. The sidewall includes a wire mesh having a plurality of wires.

19 Claims, 9 Drawing Sheets

(56) References Cited

U.S. PATENT DOCUMENTS

| | | | |
|---|---|---|---|
| 7,717,029 B2 * | 5/2010 | Rowe et al. | A47J 37/06 99/398 |
| 10,136,760 B2 | 11/2018 | Markussen et al. | |
| 2004/0200359 A1 * | 10/2004 | Snider | A47J 27/00 99/446 |
| 2009/0277339 A1 | 11/2009 | Andrade | |
| 2011/0097468 A1 * | 4/2011 | Driscoll et al. | A47J 37/04 426/519 |

FOREIGN PATENT DOCUMENTS

| | | | |
|---|---|---|---|
| DE | 102015008679 A1 * | 1/2017 | A47J 37/0694 |
| KR | 2020110010068 U | 11/2011 | |
| KR | 101857206 B1 * | 5/2018 | A47J 37/067 |
| WO | WO 0165946 A1 * | 9/2001 | A47J 36/20 |

OTHER PUBLICATIONS

Machine translation of DE 102015008679 A1 performed on Sep. 14, 2022, Rockel et al. (Year: 2017).*
Machine translation of KR 101857206 B1 performed on Sep. 14, 2022, Lee et al. (Year: 2018).*
Machine translation of CN 109803565 A performed on Sep. 14, 2022, Mcnerney et al. (Year: 2019).*
Machine translation of BR 6802484 U performed on May 18, 2023, Scheffer (Year: 1989).*

* cited by examiner

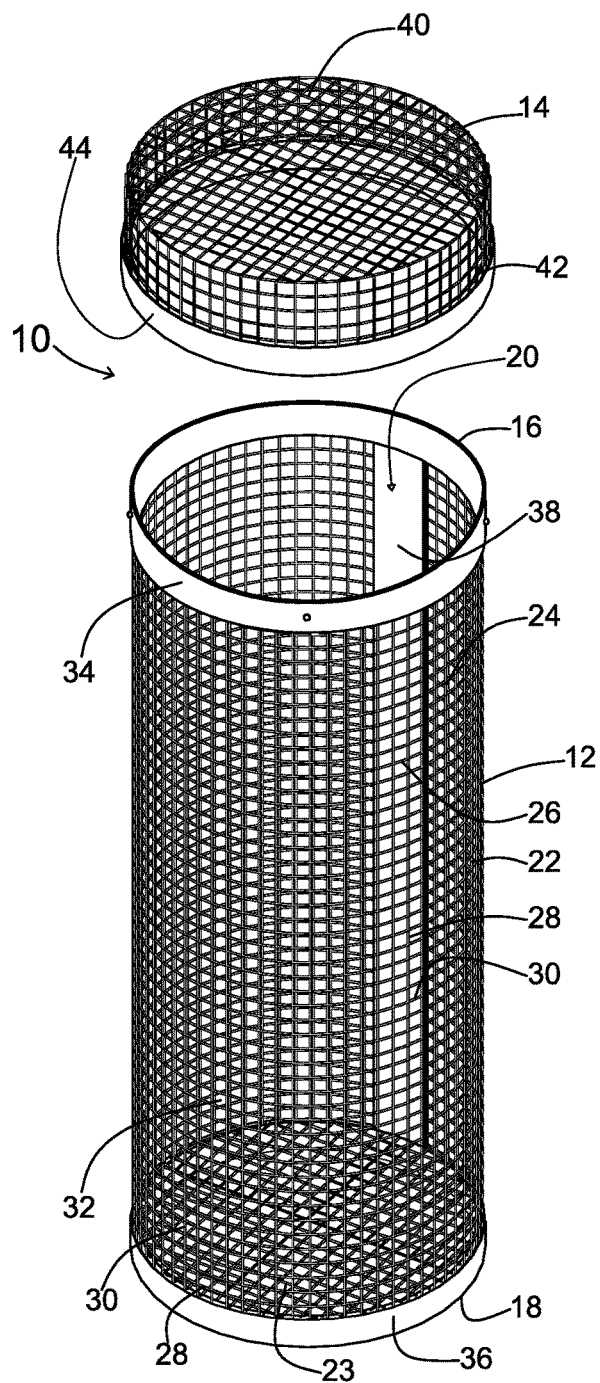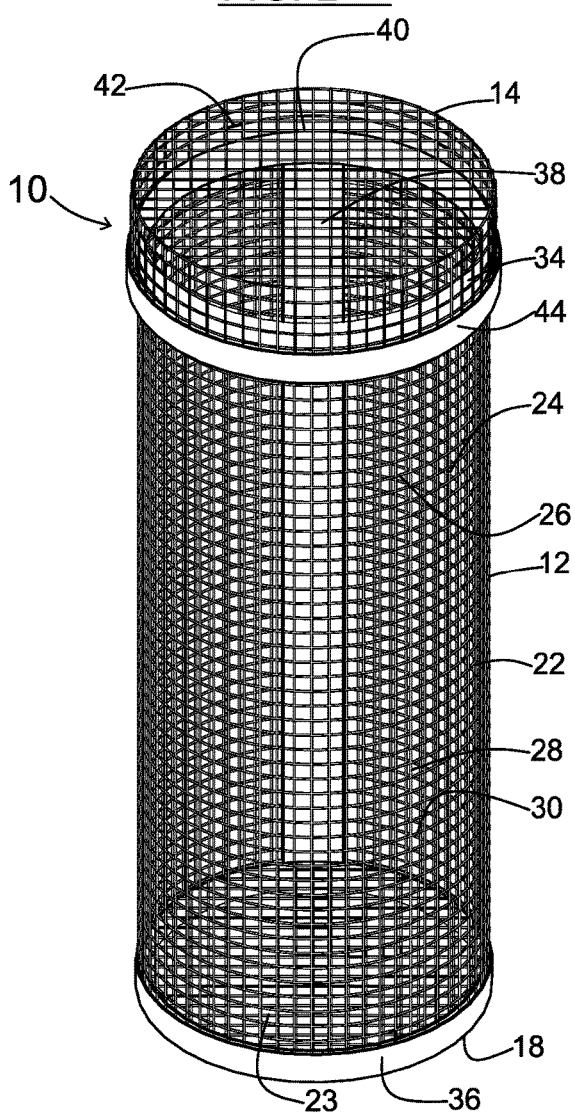

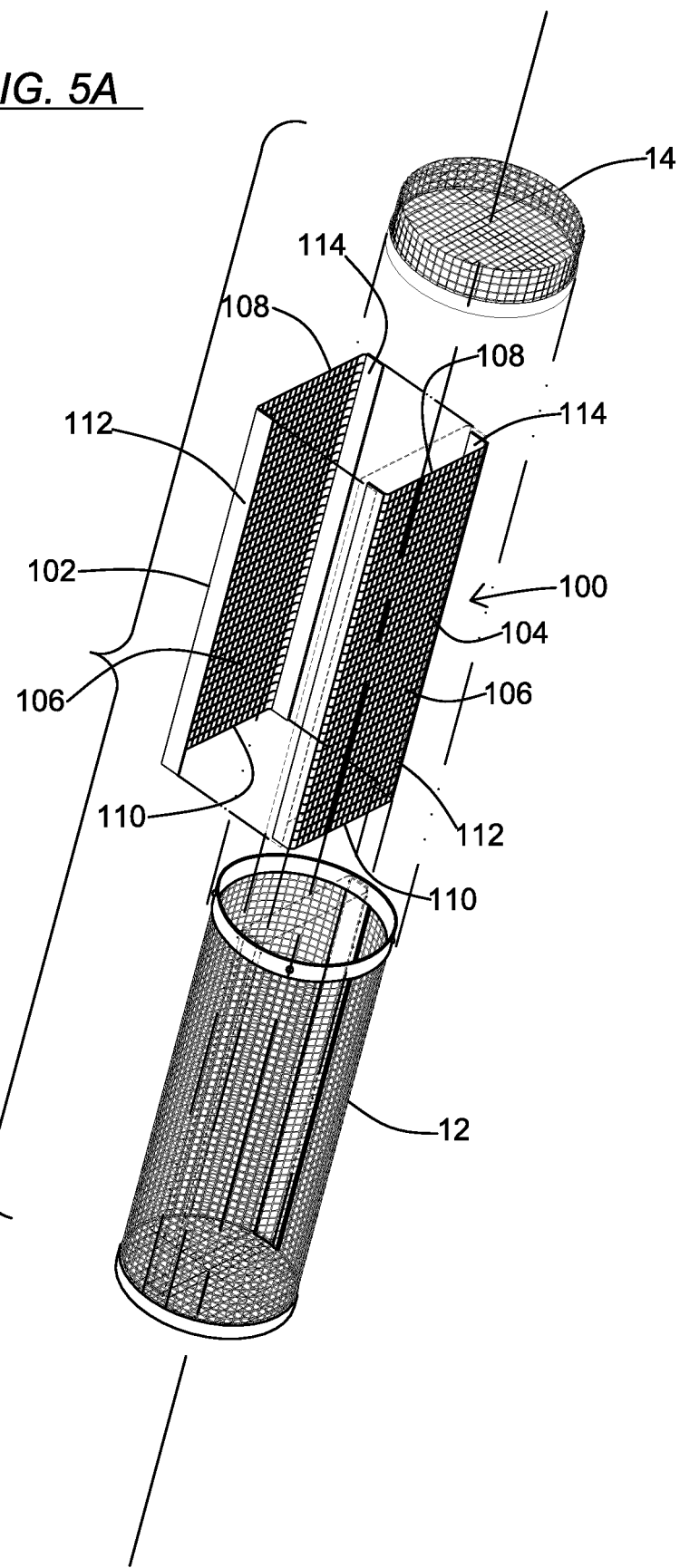

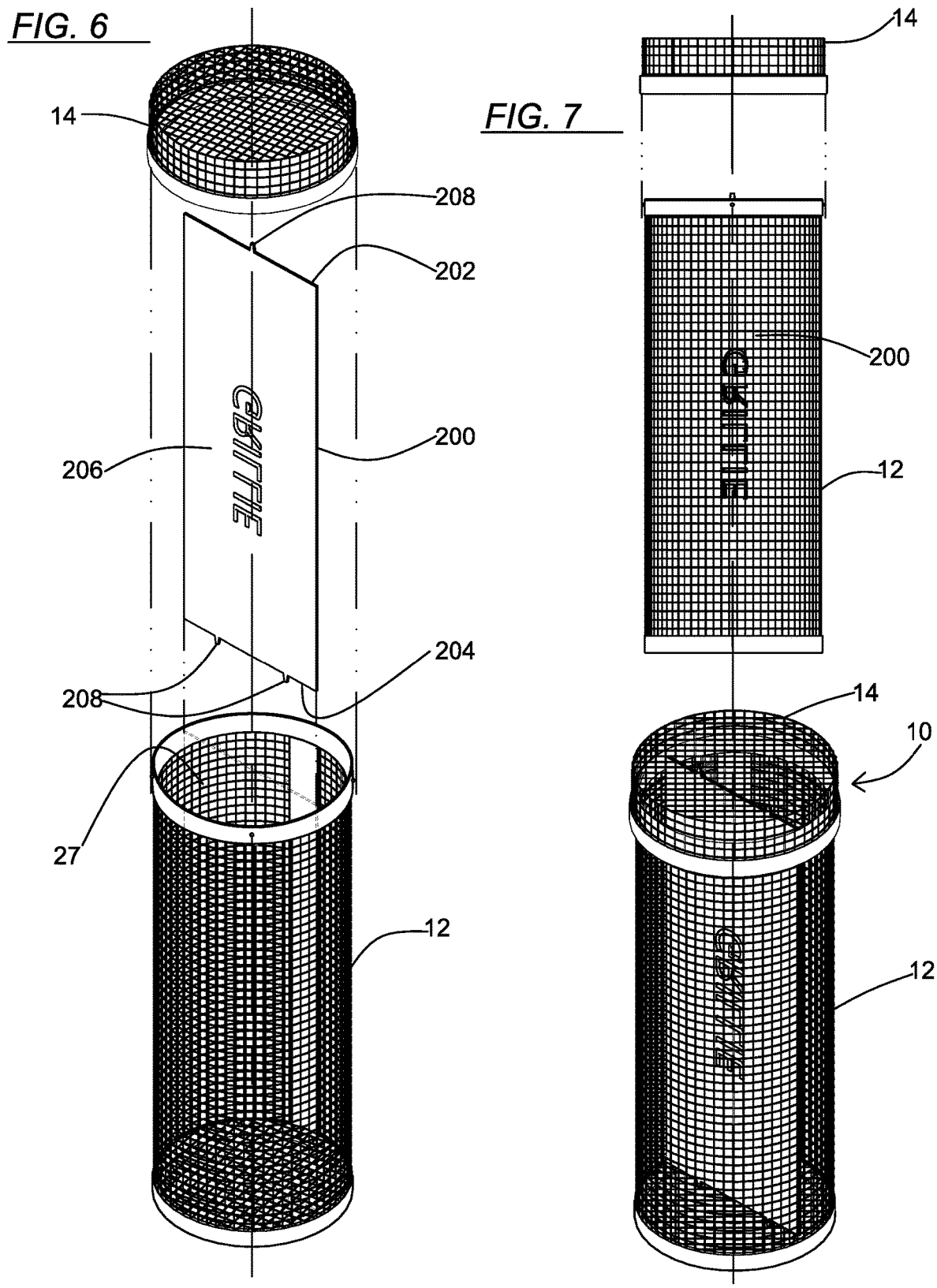

FIG. 9
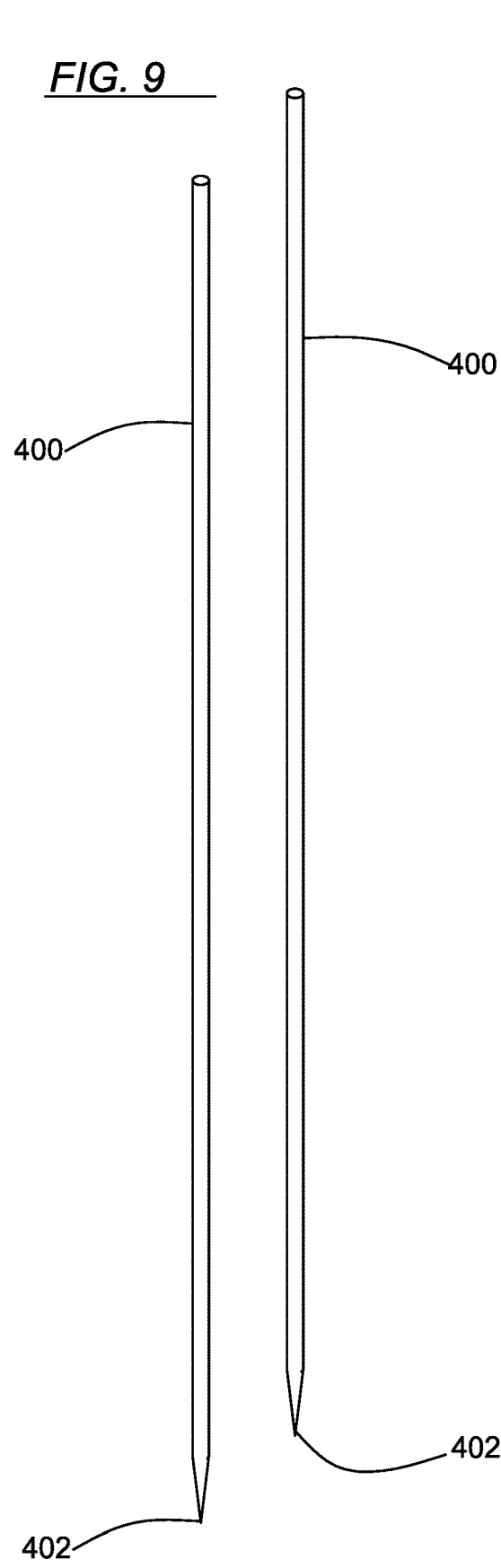
FIG. 10
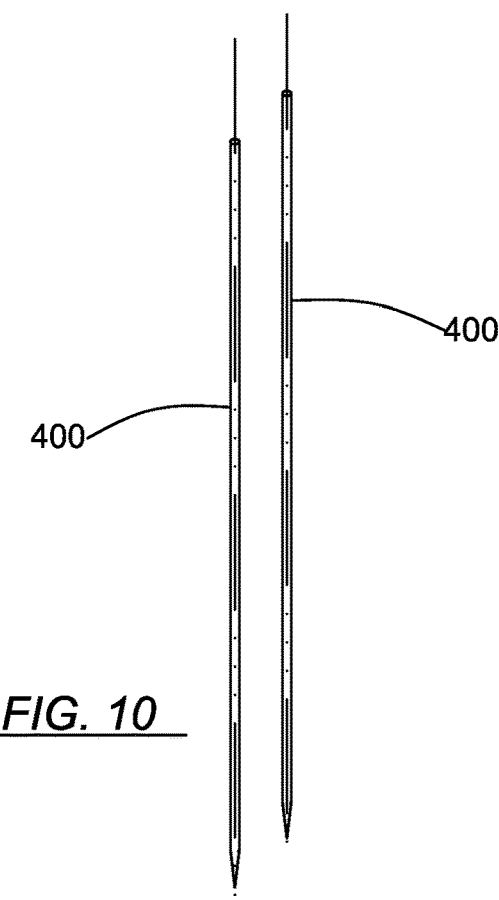
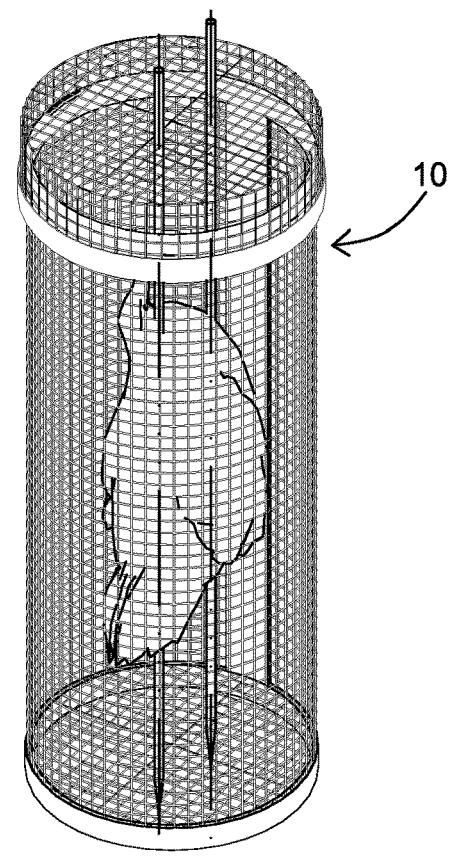

FIG. 11A
FIG. 11B
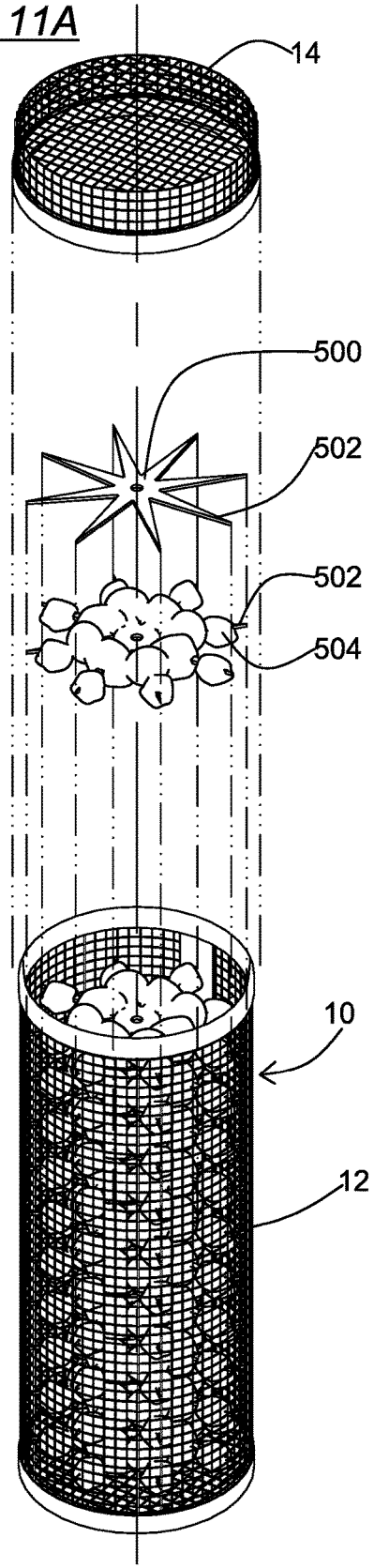
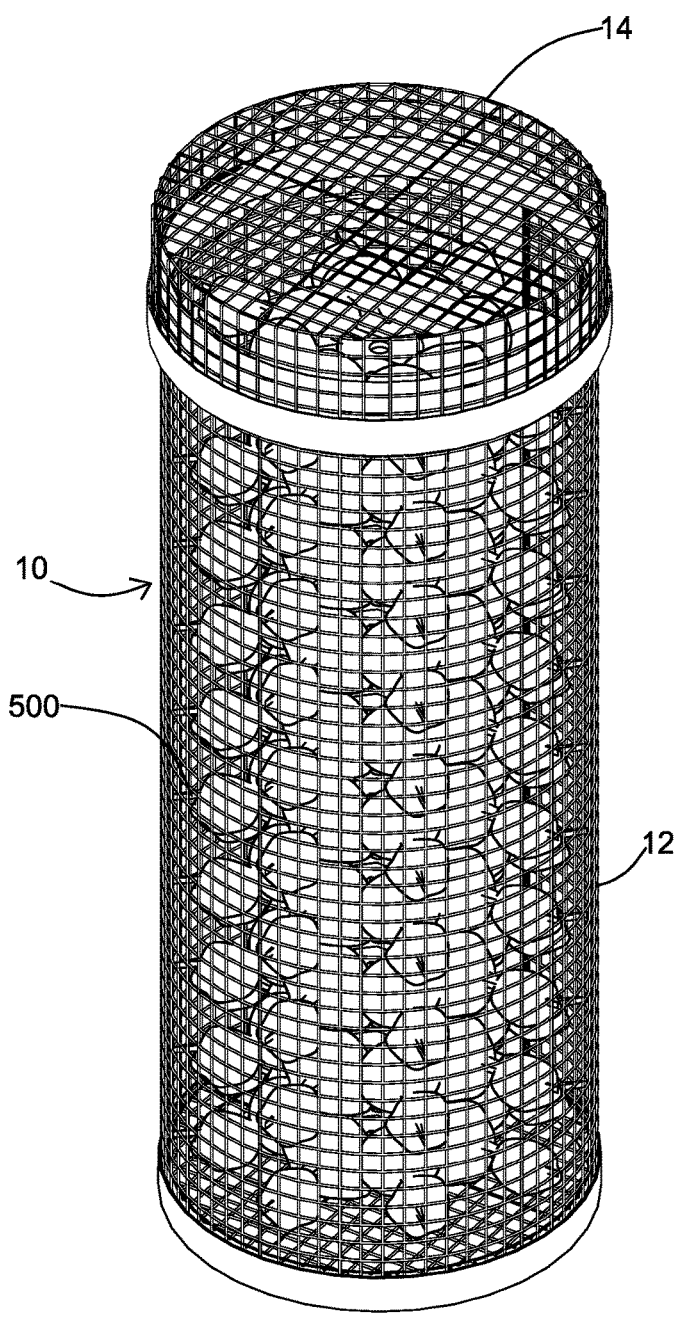

COOKING APPARATUS

CROSS-REFERENCE TO RELATED APPLICATION

This application is a Section 111(a) application relating to and claiming the benefit of commonly-owned, U.S. Provisional Patent Application Ser. No. 62/876,899, entitled "COOKING APPARATUS," filed Jul. 22, 2019, the entirety of which is incorporated herein by reference.

FIELD OF THE INVENTION

The present invention relates to cooking apparatus and, more particularly, a wire mesh cooking basket having a removable closure for receiving and holding food to be cooked.

BACKGROUND OF THE INVENTION

People love to cook food using outdoor grills, such as gas grills and charcoal grills. The purpose of the cooking apparatus is to cook foods that normally would not be cooked easily on the grill or BBQ. Small size food that would normally fall through the grill can be cooked with this cooking apparatus. The apparatus also offers a way to cook multiple foods in one device, thus allowing one to mix flavors that could not be done using traditional grilling. The cooking apparatus helps to keep the grill clean. The cooking apparatus is portable and can be pre-filled with food for transport to other locations or used at a future time.

SUMMARY OF THE INVENTION

In an embodiment, a cooking basket includes a cylindrical-shaped container and a cap removably attached to the container. In an embodiment, the container includes a sidewall and a bottom wall, each of which is constructed from a wire mesh containing a plurality of wires, forming a plurality of openings. Similarly, the cap is constructed from a wire mesh containing a plurality of wires, forming a plurality of openings. In an embodiment, the basket is made of stainless steel. Food is inserted within the basket and the basket may be placed on a cooking surface, such as a grill or open fire, to cook the contents evenly and effectively.

In an embodiment, a cooking apparatus, includes a container having a first end, a second end opposite the first end, a sidewall extending from the first end to the second end, an opening located that the first end, an end wall located at the second end, and a cap removably attached to the first end, wherein the sidewall and the end wall form a compartment that is sized and shaped to receive at least one first food item, wherein the sidewall includes a wire mesh having a plurality of wires, wherein each of the plurality of wires includes a diameter in a range of 0.011 inch to 0.25 inch.

In an embodiment, the container is cylindrical in shape. In an embodiment, each of the plurality of wires includes a first plurality of wires, each of which extends longitudinally from the first end to the second end, and a second plurality of wires, each of which extends circumferentially and extends perpendicular to the first plurality of wires. In an embodiment, each of the first plurality of wires is spaced apart from one another by a first distance in a range from 0.125 inch to 1 inch, and wherein each of the second plurality of wires is spaced apart from one another by a second distance in a range from 0.125 inch to 1 inch.

In an embodiment, the first plurality of wires and the second plurality of wires form a plurality of openings. In an embodiment, each of the plurality of openings includes a shape selected from the group consisting of square, diamond, hexagonal, circular, and rectangular. In an embodiment, the plurality of wires is made from a material selected from the group consisting of stainless steel, 304 stainless steel, 309 stainless steel, 316 stainless steel, and carbon steel. In an embodiment, the plurality of wires includes a non-stick coating.

In an embodiment, the end wall includes a wire mesh having a plurality of wires, wherein each of the plurality of wires of the end wall includes a diameter in a range of 0.011 inch to 0.25 inch. In an embodiment, the cap includes a wire mesh having a plurality of wires, wherein each of the plurality of wires of the cap includes a diameter in a range of 0.011 inch to 0.25 inch.

In an embodiment, the cap includes a top wall and a sidewall extending from the top wall. In an embodiment, the container includes a first band circumferentially extending at the first end thereof and a second band circumferentially extending at the second end thereof, wherein the sidewall of the cap includes a third band circumferentially extending at a free end thereof, and wherein the third band of the cap is adapted to frictionally engage the second band of the container. In an embodiment, the container includes a fourth band extending longitudinally from the first band to the second band.

In an embodiment, the cooking apparatus further includes a food cage having a first portion and a second portion attached removably to the first portion, each of the first portion and the second portion includes a flat mesh surface having a first end, a second end opposite the first end of the flat mesh surface, and a pair of opposing side bands extending outwardly from the flat mesh surface and extending from the first end of the flat mesh surface to the second end of the flat mesh surface, wherein the first portion and the second portion form a second compartment adapted to receive at least one second food item, and wherein the food cage is adapted to be removably inserted within the compartment of the container, and wherein the at least one first food item is adapted to be positioned between the sidewall of the container and one of the flat mesh surfaces of the first portion and the second portion. In an embodiment, each of the flat mesh surfaces includes a plurality of wires. In an embodiment, each of the flat mesh surfaces is rectangular in shape.

In an embodiment, the cooking apparatus further comprises a grill plate having a first surface and a second surface opposite the first surface, wherein the grill plate is adapted to be removably inserted within the compartment of the container, and wherein the at least one food item is adapted to be positioned on one of the first surface and the second surface.

In an embodiment, the cooking apparatus further comprises a cylinder having a first end, a second end opposite the first end of the cylinder, a wall extending from the first end of the cylinder to the second end of the cylinder, an interior portion extending from the first end of the cylinder to the second end of the cylinder, and a plurality of holes extending through the wall and in fluid communication with the interior portion, wherein the cylinder is adapted to be removably inserted within the compartment of the container, and wherein the at least one food item is adapted to be positioned intermediate the sidewall of the compartment and the wall of the cylinder.

In an embodiment, the cooking apparatus further comprises a plurality of heating inserts, each of which includes central portion and a plurality of elongated pointed members extending from the central portion, wherein each of the plurality of elongated pointed members is adapted to pierce and receive at least one of the at least one food item, wherein the plurality of heating inserts is adapted to be removably inserted within the compartment of the container. In an embodiment, the cooking apparatus includes an outer diameter in a range of 3 inches to 8 inches, and a length in a range of 6 inches to 18 inches.

BRIEF DESCRIPTION OF THE DRAWINGS

FIG. 1 is an exploded, top perspective view of a cooking basket in accordance with an embodiment of the present invention, with a cap employed by the cooking basket being shown as removed from an associated container;

FIG. 2 is a top perspective view of the cooking basket shown in FIG. 1, but with the cap removably attached to the container;

FIGS. 5A through 5C are top perspective views of another embodiment of a cooking basket employing a food cage accessory;

FIGS. 6 and 7 are views of another embodiment of a cooking basket employing a cooking plate accessory;

FIGS. 9 and 10 are views of another embodiment of a cooking basket employing an accessory consisting of a plurality of heat rods; and FIGS. 11A and 11B are views of another embodiment of a cooking basket employing an accessory consisting of a plurality of cooking stars.

DETAILED DESCRIPTION OF THE DRAWINGS

Figure 3:
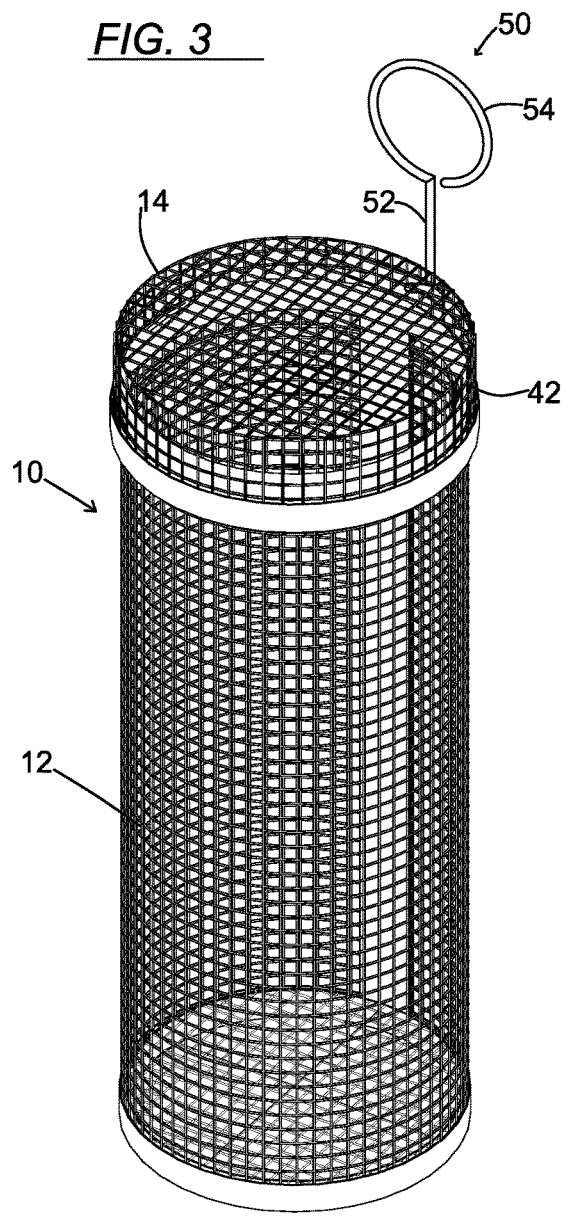
FIG. 3 is a top perspective view of the cooking basket shown in FIG. 2 with an associated cap removal tool engaged with the cap.

Referring to FIGS. 1 and 2, in an embodiment, a cooking basket 10 includes a container 12 and a cap 14 removably attached to the container 12. In an embodiment, the cooking basket 10 is cylindrical in shape. In other embodiments, the cooking basket 10 may consist of other shapes and sizes. In an embodiment, the container 12 includes a first end 16 and a second end 18 opposite the first end 16, the first end 16 including a circular-shaped opening 20. In an embodiment, the container 12 includes a sidewall 22 and a bottom wall 23, each constructed from a wire mesh 24 containing a plurality of wires 26. In an embodiment, the sidewall 22 and the bottom wall 23 form a cylindrical-shaped compartment 27. In an embodiment, the wire mesh 24 is welded wire mesh. In another embodiment, the wire mesh 24 is woven wire mesh. In another embodiment, the wire mesh 24 is crimped wire mesh. In an embodiment, the wire mesh 24 is made of stainless steel. In an embodiment, the wire mesh 24 is made of 304 stainless steel. In another embodiment, the wire mesh 24 is made of 309 stainless steel. In another embodiment, the wire mesh 24 is made of 316 stainless steel. In another embodiment, the wire mesh 24 is made of carbon steel. In another embodiment, the wire mesh 24 is made of a suitable non-stick material. In another embodiment, the wire mesh 24 includes a non-stick coating material. In other embodiments, the wire mesh 24 is made from other food cooking materials known in the art.

In an embodiment, the plurality of wires 26 of the sidewall 22 includes a first plurality of wires 28 that extend longitudinally from the first end 16 to the second end 18 and are spaced apart from one another, and a second plurality of wires 30 that extend circumferentially from the first end 16 to the second end 18 and are spaced apart from one another. In an embodiment, the first and second plurality of wires 28, 30 form a plurality of openings 32 within the side wall 22. In an embodiment, the first plurality of wires 28 of the sidewall 22 are formed substantially about a circumference of the container 12. Similarly, the plurality of wires 26 of the bottom wall 23 includes a first plurality of wires 28 that extend in a first direction and a second plurality of wires 30 that extend in a second direction perpendicular to the first direction, forming a plurality of openings 32.

Still referring to FIGS. 1 and 2, in an embodiment, the container 12 includes a first ring-shaped band 34 extending circumferentially at the first end 16, a second ring-shaped band 36 extending circumferentially at the second end 18, and a third, elongated band 38 extending longitudinally from the first end 16 to the second end 18. The first and second bands 34, 36 cover respective ends of the wire mesh 24 to eliminate any residual sharp edges of ends of the wires 26, while the third band 38 connects ends of the wire mesh 24 that form the sidewall 22. In an embodiment, the first, second and third bands 34, 36, 38 are each made of stainless steel. In another embodiment, each of the first, second and third bands 34, 36, 38 comprise a circular rod that is welded to the wire mesh 24.

With continued reference to FIGS. 1 and 2, in an embodiment, the cap 14 is constructed from the wire mesh 24 and is disc shaped. In an embodiment, the cap 14 includes a circular-shaped top wall 40 and a sidewall 42 extending from the top wall 40. In an embodiment, the cap 14 includes ring-shaped band 44 positioned at an edge of the sidewall 42 for covering the ends of the wires 26 of the wire mesh 24. In an embodiment, the cap 14 is removably attached to the first end 16 of the container 12. In an embodiment, the band 34 of the container 12 and the band 44 of the cap 14 are sized and shaped such that the cap 14 is removably attached to the container 12 by a friction fit. In an embodiment, the band 34 of the container includes at least one pressing 46 to provide for friction fit with the band 44 of the cap 14. In an embodiment, the at least one pressing 46 includes a plurality of pressings 46. In an embodiment, the pressings 46 are circular in shape and each ⅜" in diameter. In other embodiments, the cap 14 may be attached removably to the container 12 by other fastening and closure means known in the art, e.g., corresponding internal threads on the cap 14 and external threads on the container 12, tabs, snaps, knurling, hooks, and/or hinges.

In an embodiment, a diameter of each of the plurality wires 26 is 0.028 inch and spacing between two of the wires 26 positioned in adjacent rows or columns is 0.25 inch (spacing range 0.25 inch×0.25 inch). In various other embodiments, the wire mesh 24 may include properties selected from the following Table 1:

TABLE I

Wire Mesh Properties

| Embodiment | Wire (26) Spacing Range | Per Inch | Range of Diameters of Wire (26) |
|---|---|---|---|
| 1 | ⅛ inch × ⅛ inch | 8 × 8 (can also be 16 × 16) | 0.011 inch to 0.063 inch |
| 2 | 0.14 inch × 0.14 inch | 7 × 7 | 0.028 inch to 0.035 inch |
| 3 | 0.166 inch × 0.166 inch | 6 × 6 | 0.028 inch to 0.063 inch |
| 4 | 0.20 inch × 0.20 inch | 5 × 5 | 0.032 inch to 0.08 inch |
| 5 | ¼ inch × ¼ inch | 4 × 4 | 0.025 inch to 0.120 inch |
| 6 | 0.333 inch × 0.333 inch | 3 × 3 | 0.038 inch to 0.120 inch |
| 7 | ½ inch × ½ inch | 2 × 2 | 0.035 inch to 0.135 inch |
| 8 | ¾ inch × ¾ inch | 1.33 × 1.33 | 0.080 inch to 0.120 inch |
| 9 | 1.0 inch × 1.0 inch | 1 × 1 (can also be 1.25 × 1.25) | 0.063 inch to 0.25 inch |

In an embodiment, each of the plurality of wires 26 includes a diameter in a range of 0.011 inch to 0.25 inch. In another embodiment, each of the plurality of wires 26 includes a diameter in a range of 0.028 inch to 0.25 inch. In another embodiment, each of the plurality of wires 26 includes a diameter in a range of 0.032 inch to 0.25 inch. In another embodiment, each of the plurality of wires 26 includes a diameter in a range of 0.035 inch to 0.25 inch. In another embodiment, each of the plurality of wires 26 includes a diameter in a range of 0.038 inch to 0.25 inch. In another embodiment, each of the plurality of wires 26 includes a diameter in a range of 0.063 inch to 0.25 inch.

In another embodiment, each of the plurality of wires 26 includes a diameter in a range of 0.011 inch to 0.135 inch. In another embodiment, each of the plurality of wires 26 includes a diameter in a range of 0.025 inch to 0.135 inch. In another embodiment, each of the plurality of wires 26 includes a diameter in a range of 0.028 inch to 0.135 inch. In another embodiment, each of the plurality of wires 26 includes a diameter in a range of 0.032 inch to 0.135 inch. In another embodiment, each of the plurality of wires 26 includes a diameter in a range of 0.035 inch to 0.135 inch. In another embodiment, each of the plurality of wires 26 includes a diameter in a range of 0.038 inch to 0.135 inch. In another embodiment, each of the plurality of wires 26 includes a diameter in a range of 0.063 inch to 0.135 inch. In another embodiment, each of the plurality of wires 26 includes a diameter in a range of 0.080 inch to 0.135 inch.

In another embodiment, each of the plurality of wires 26 includes a diameter in a range of 0.011 inch to 0.12 inch. In another embodiment, each of the plurality of wires 26 includes a diameter in a range of 0.025 inch to 0.12 inch. In another embodiment, each of the plurality of wires 26 includes a diameter in a range of 0.028 inch to 0.12 inch. In another embodiment, each of the plurality of wires 26 includes a diameter in a range of 0.032 inch to 0.12 inch. In another embodiment, each of the plurality of wires 26 includes a diameter in a range of 0.035 inch to 0.12 inch. In another embodiment, each of the plurality of wires 26 includes a diameter in a range of 0.038 inch to 0.12 inch. In another embodiment, each of the plurality of wires 26 includes a diameter in a range of 0.063 inch to 0.12 inch. In another embodiment, each of the plurality of wires 26 includes a diameter in a range of 0.080 inch to 0.12 inch.

In another embodiment, each of the plurality of wires 26 includes a diameter in a range of 0.011 inch to 0.080 inch. In another embodiment, each of the plurality of wires 26 includes a diameter in a range of 0.025 inch to 0.080 inch. In another embodiment, each of the plurality of wires 26 includes a diameter in a range of 0.028 inch to 0.080 inch. In another embodiment, each of the plurality of wires 26 includes a diameter in a range of 0.032 inch to 0.080 inch. In another embodiment, each of the plurality of wires 26 includes a diameter in a range of 0.035 inch to 0.080 inch. In another embodiment, each of the plurality of wires 26 includes a diameter in a range of 0.038 inch to 0.080 inch. In another embodiment, each of the plurality of wires 26 includes a diameter in a range of 0.063 inch to 0.080 inch.

In another embodiment, each of the plurality of wires 26 includes a diameter in a range of 0.011 inch to 0.063 inch. In another embodiment, each of the plurality of wires 26 includes a diameter in a range of 0.025 inch to 0.063 inch. In another embodiment, each of the plurality of wires 26 includes a diameter in a range of 0.028 inch to 0.063 inch. In another embodiment, each of the plurality of wires 26 includes a diameter in a range of 0.032 inch to 0.063 inch. In another embodiment, each of the plurality of wires 26 includes a diameter in a range of 0.035 inch to 0.063 inch. In another embodiment, each of the plurality of wires 26 includes a diameter in a range of 0.038 inch to 0.063 inch.

In another embodiment, each of the plurality of wires 26 includes a diameter in a range of 0.011 inch to 0.035 inch. In another embodiment, each of the plurality of wires 26 includes a diameter in a range of 0.025 inch to 0.035 inch. In another embodiment, each of the plurality of wires 26 includes a diameter in a range of 0.028 inch to 0.035 inch. In another embodiment, each of the plurality of wires 26 includes a diameter in a range of 0.032 inch to 0.035 inch.

In an embodiment, the wire mesh 24 is square wire mesh and each of the plurality of openings 32 is substantially square in shape. In other embodiments, the wire mesh 24 may consist of other shapes and sizes, such that the openings 32 are diamond, rectangular, hexagonal or circular in shape. In another embodiment, the wire mesh 24 may be woven mesh.

In an embodiment, the length of the cooking basket 10 is in a range of about 12 inches to 13 inches. In other embodiments, the length of the cooking basket 10 may be greater than 13 inches, or it may be less than 12 inches. In another embodiment, the length of the cooking basket 10 may be in a range from about 6 inches to about 18 inches. In an embodiment, the diameter of the cooking basket 10 is about 5 inches. In other embodiments, the diameter of the cooking apparatus 10 may be greater or less than 5 inches. In another embodiment, the diameter of the cooking apparatus 10 may be in a range of about 3 inches to 8 inches. In other embodiments, the cooking apparatus may be collapsible or expendable in length axially by way of two containers that are sized and shaped to telescopically engage one another so as to adjust the length (not shown in the Figures). In an embodiment, a plurality of the cooking baskets 10 can each have different sizes so that at least one of the baskets 10 can be nested inside another of the baskets 10 for storage. In an embodiment, the plurality of cooking baskets 10 includes at least three (3) baskets in successively smaller diameters and lengths. Different sizes of the cooking baskets 10 can accommodate different sized grills and for a user's regulation of the associated food portions.

In an embodiment, a user positions food (e.g., meat, seafood, vegetables, fruit, etc.) inside the compartment 27 of the container 12 and the cap 14 is attached to the container 12 to close the compartment 27. In an embodiment, the cooking basket 10 may be shaken with the food inside the compartment 27 to mix the ingredients with one another. The cooking basket 10 may then be placed on or within a cooking vessel, such as a grill or an oven. In an embodiment, the cooking basket 10 may be used with standard household barbeque grills, such as gas grills, charcoal grills and open fire pits. In other embodiments, the cooking basket 10 may be used with other food heating and cooking vessels, such as conventional ovens. In an embodiment, the cooking basket 10 is sized and shaped to fit under an upper shelf of a standard barbeque grill to maximize room on the grill surface.

During the cooking process, heat from the cooking vessel heats the wire mesh 24 while the openings 32 allow for the entry and circulation of heat and air within the compartment 27 to cook the food evenly and effectively. In an embodiment, the cooking basket 10 may be turned and rolled relative to the cooking surface with a grill fork or other cooking utensils for even cooking and mixing of the food contents. In an embodiment, the openings 32 enable a user to add other ingredients during the cooking process, such as salt, pepper, or other spices, or to spray cooking or basting oil and marinades and sauces to the food inside the compartment 27 without the need to remove the cap 14.

Figure 4:
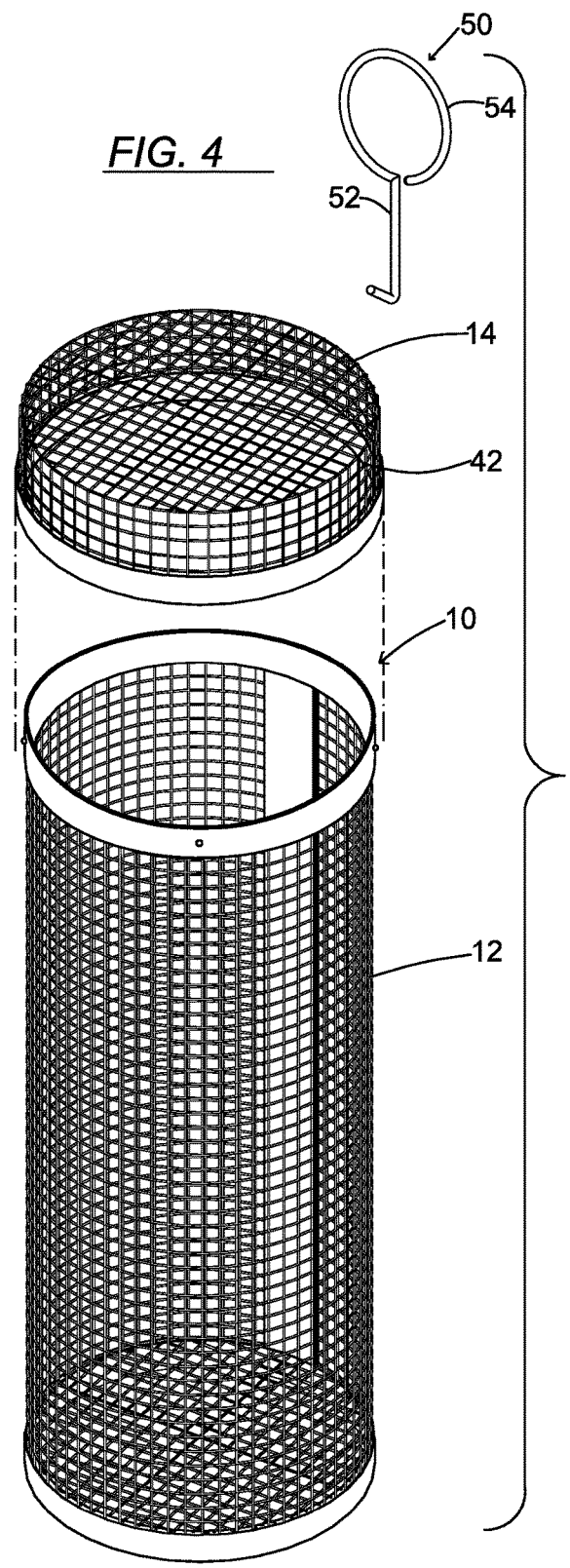
FIG. 4 is a top perspective view of the cooking basket shown in FIG. 3, with the cap removed by the cap removal tool.

Once cooking of the food is completed, a user may remove the cooking basket 10 from the heat vessel with tongs, an oven mitt or the like. In an embodiment, in or about 30 to 60 seconds after removing the cooking basket 10 completely from the heat source of the cooking vessel, the cooking basket 10 may then be picked up with a user's bare hand, due to the structure and materials of the basket 10 quickly dispersing heat. A user can remove the cap 14 from the container 12 by hand or by a cap removal tool 50 as shown in FIGS. 3 and 4. In an embodiment, the cap removal tool 50 includes a hook member 52 and a ring 54. A user grips the ring 54, inserts the hook member 52 into one of the openings 32 of the cap 14, preferably one of the openings 32 in the sidewall 42 of the cap 14, and pulls the cap 14 off with some force. The food in the compartment 27 may then be accessed or poured out of the container 12. The cooking basket 10 is washable by hand or dishwasher and reusable.

Figure 5B:
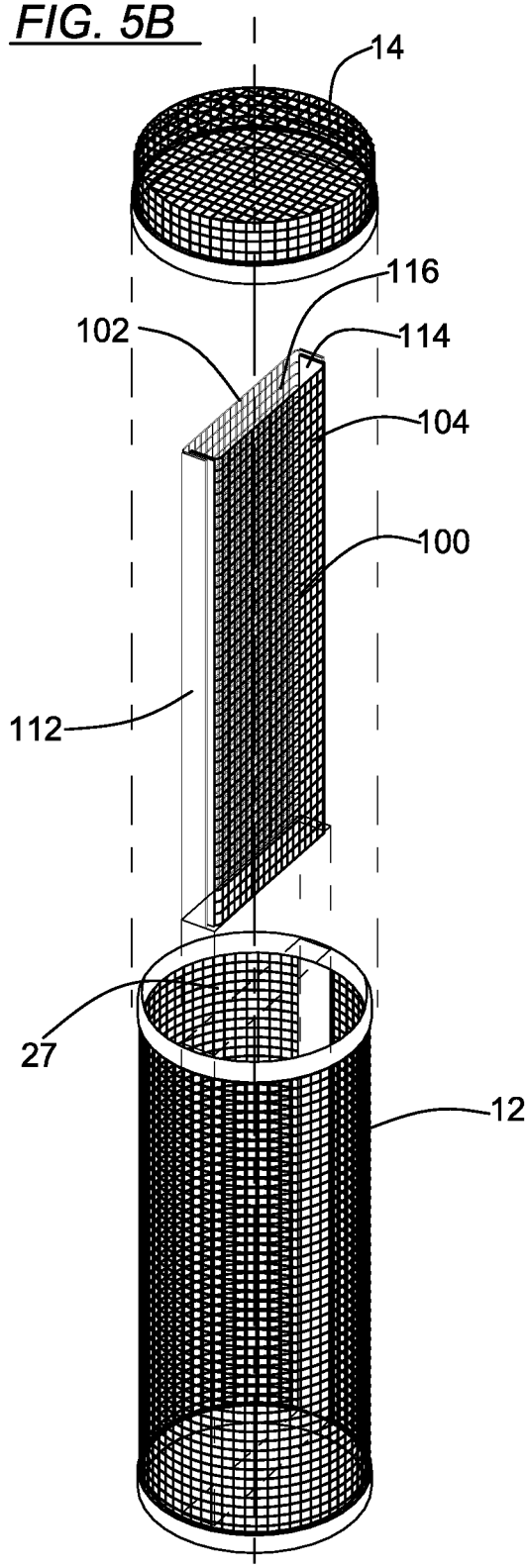
Figure 5C:
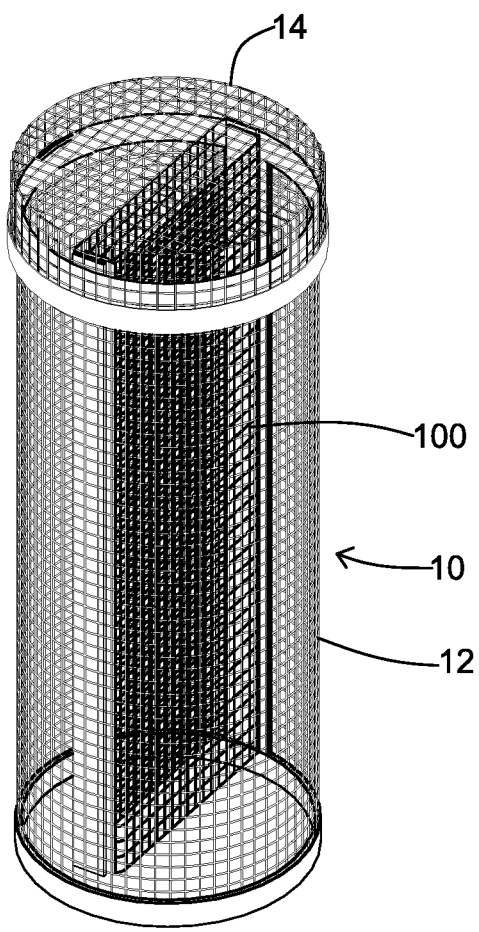

Referring to FIGS. 5A through 5C, in an embodiment, a food cage 100 is adapted to be inserted removably within the cooking basket 10. In an embodiment, the food cage 100 is adapted to receive and contain flat food, such as fish filets or chicken breasts and cutlets. In an embodiment, the food cage 100 includes first and second portions 102, 104, each of which includes a flat mesh surface 106 having a first end 108, a second end 110 opposite the first end 108, and a pair of opposing side bands 112, 114 extending outwardly from the flat mesh surface 106 and from the first end 108 to the second end 110 thereof. In an embodiment, the flat mesh surfaces 106 are made from the same wire mesh 24 as that of the cooking apparatus 10. In an embodiment, the flat mesh surfaces 106 are made of stainless steel, such as 304 or 316 stainless steel. In an embodiment, the bands 112, 114 are made of stainless steel. In an embodiment, the flat mesh surfaces 106 are each rectangular in shape. In an embodiment, the first and second portions 102, 104 are attached removably with one another by friction fit between the corresponding bands 112, 114 thereof, thereby forming an interior compartment 116 (see FIG. 5B). In an embodiment, a food item is placed on one mesh surface 106 of one of the first and second portions 102, 104 and the other of the first and second portions 102, 104 is connected thereto, such that the food item is contained within the compartment 116. In an embodiment, the food cage 100 is inserted into the center of the compartment 27 of the container 12 of the cooking basket 10 by friction fit, and the cap 14 is installed on the container, as shown in FIGS. 5B and 5C. Additional food items may be placed in the compartment 27 of the cooking apparatus 100 located on either or both sides of the food cage 100. The cooking apparatus 10 with the food cage 100 may then be used with a cooking vessel such as an oven or grill as described above. In an embodiment, the food cage 100 is adapted to allow for three different foods to be cooked together while being separate from one another. The food cage 100 adopts the flavors from the two chambers of food on either side of the cage 100. The food cage 100 allows for the food to be cooked through convection while food within the two exterior chambers can be cooked directly on the grill surface.

Referring to FIGS. 6 and 7, in an embodiment, a grill plate 200 is adapted to be inserted removably within the cooking basket 10. In an embodiment, the grill plate 200 is adapted to hold flat foods, such as meat, fish filets or chicken cutlets and breasts. The purpose of the grill plate 200 is twofold; first, to create a separate grilling surface and second to cook different foods without mixing flavors. The grill plate 200 creates two chambers within the interior compartment 27. In an embodiment, the grill plate 200 will reach temperatures similar to the temperatures inside the grill. In an embodiment, the grill plate 200 can be heated to a temperature in a range of 500-600 degrees F., thereby cooking the foods directly on the plate side and grilling on the mesh side, in addition to the convection cooking. In an embodiment, the grill plate 200 includes a first end 202 and a second end 204 opposite the first end, and opposing flat grilling surfaces 206 extending from the first end 202 to the second end 204 (one of which is shown). In an embodiment, one or each end 202, 204 of the grill plate 200 includes a tab 208 extending longitudinally therefrom. In an embodiment, the grill plate 200 is made of copper. In other embodiments, the grill plate may be made of other food cooking materials such as aluminum. In an embodiment, the grill plate 200 has a thickness in range of about 1/18" to 1/8 inch. In an embodiment, the grill plate 200 is coated with a metal coating, such a tin. In an embodiment, the grill plate 200 may include embossed words, numbers, symbols, or a combination thereof for "branding" the food item with same. In an embodiment, a food item is placed on the grilling surface 206 and the grill plate 200 is inserted into the center of the compartment 27 of the container 12 of the cooking basket 10, and the cap 14 is installed. In an embodiment, the tabs 208 engage the openings 32 of the bottom wall 23 of the container 12 and the top wall 40 of the cap 14 for stability of the grill plate 200 within the cooking basket 10. Additional food items may be placed in the compartment 27 of the cooking basket 10 on one side of the grill plate 200. The cooking basket 10 with the grill plate 200 may then be used with a cooking vessel such as an oven or grill as described above.

Figure 8A:
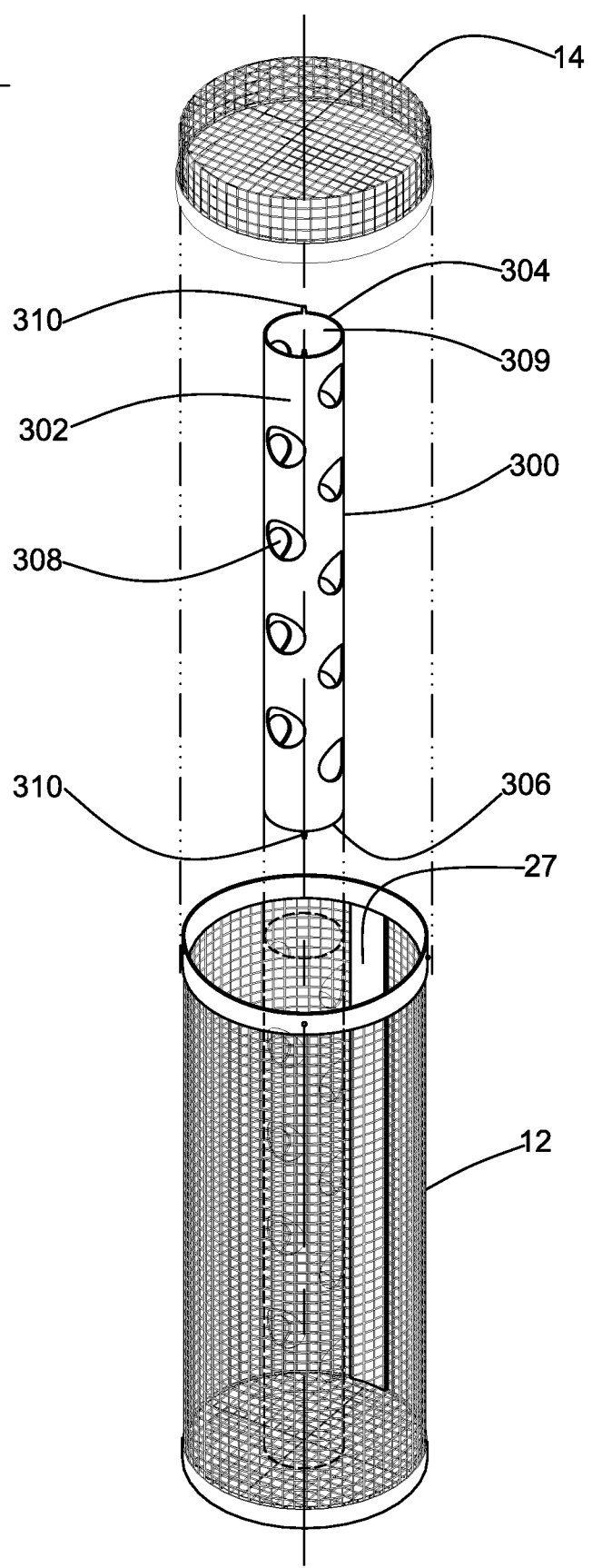
FIGS. 8A through 8C are top perspective views of another embodiment of a cooking basket employing a cooking cylinder accessory.
Figure 8B:
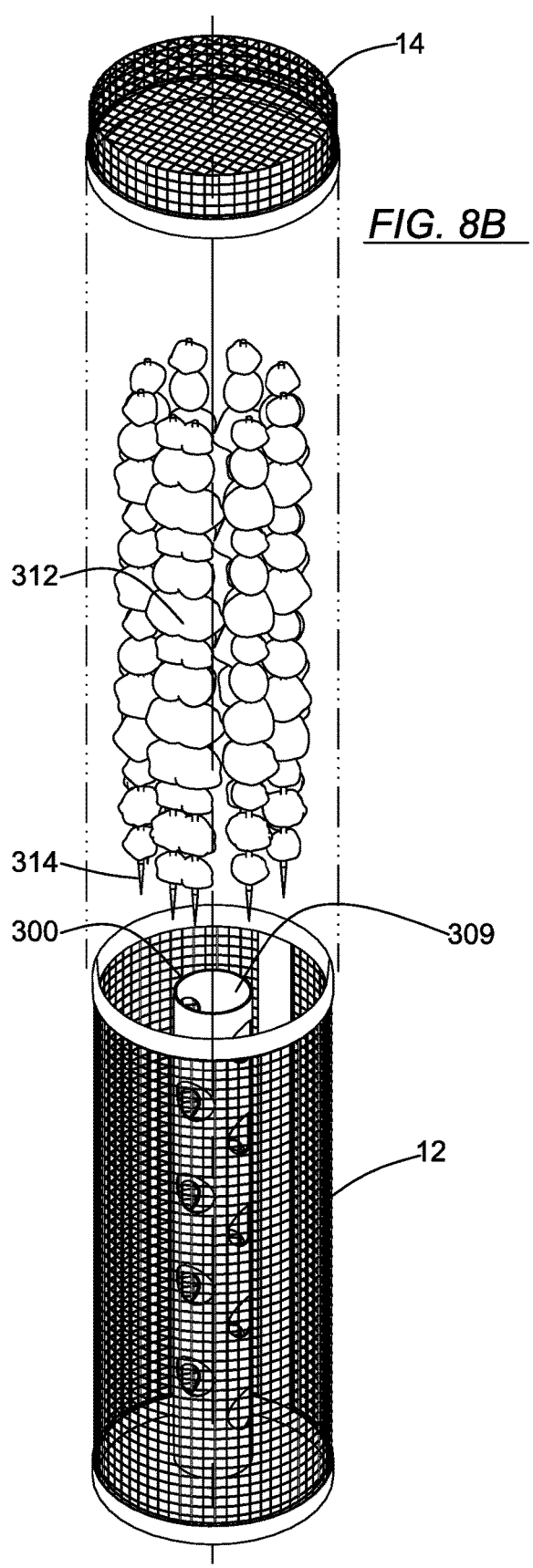
Figure 8C:
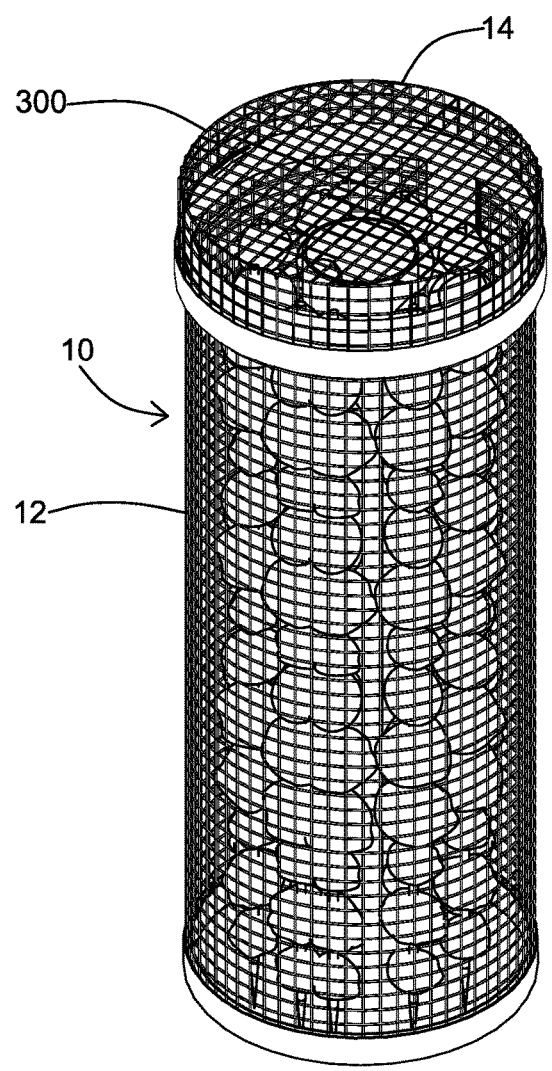

Referring to FIG. 8A through 8C, in an embodiment, a food cylinder 300 is adapted to be inserted removably within the cooking basket 10. In an embodiment, the food cylinder 300 is tubular in shape and includes a wall 302 having a first end 304 and a second end 306 opposite the first end 304, and plurality of vent holes 308 extending within the wall 302 into an interior portion 309, and are spaced from the first end 304 to the second end 306. In an embodiment, one or each end 304, 306 of the food cylinder 300 includes at least one tab 310 extending longitudinally therefrom. In an embodiment, the food cylinder 300 is made from copper. In other embodiments, the food cylinder is made from other high heat conducting materials, such as aluminum, carbon steel and copper. In an embodiment, the food cylinder 300 is inserted into the center of the compartment 27 of the container 12 of the cooking basket 10. Food, such as shish kabobs 312 on associated sticks 314, as shown in FIG. 8B, is placed in the container 12 and spaced around the food cylinder 300, and the cap 14 is installed. In an embodiment, the tabs 310 engage the openings 32 of the bottom wall 23 of the container 12 and the top wall 40 of the cap 14 for stability of the food cylinder 300 within the cooking basket 10. The food cylinder 300 provides a stable configuration of the shish kabobs 312 (or other appropriate food items) within the cooking basket 10. The cooking basket 10 with the food cylinder 300 may then be used with a cooking vessel such as an oven or grill as described above. The food cylinder 300 allows for heating of the food items (e.g., kabobs 312) from the inside. The vent holes 308 allow the heat to penetrate the food and air to circulate. In another embodiment, the interior tubular portion 309 is adapted to receive other food items, such as bacon and other slices of meats, to provide for additional flavoring on the kabobs 312.

Referring to FIGS. 9 and 10, in an embodiment, a plurality of heating rods 400 are adapted to be inserted removably within the cooking basket 10. In an embodiment, each of the heating rods 400 includes a pointed, skewer end 402 adapted to pierce a food item, such as poultry, ham or beef. The food item skewered with the rods 400 are adapted to be inserted within the cooking basket 10. In an embodiment, each of the heating rods 400 has a diameter in a range of about 3/16" to about 1/4". In an embodiment, the heating rods 400 engage openings 32 of the bottom wall 23 of the container 12 and the top wall 40 of the cap 14 for stability of the rods 400 and associated food item within the cooking basket 10. The cooking basket 10 with the heating rods 400 may then be used with a cooking vessel such as an oven or grill as described above.

Referring to FIGS. 11A and 11B, in an embodiment, a plurality of heating inserts 500 are adapted to be inserted removably within the cooking apparatus 10. In an embodiment, each of the heating inserts 500 are star-shaped. In an embodiment, each of the heating inserts 500 includes a plurality of elongated pointed members 502 adapted to pierce a food item 504, such as meat, seafood, or vegetables. In an embodiment, each of the heating inserts 500 includes eight of the members 502, but it may include more than eight of the members 502 or less than eight of the members 802. In an embodiment, the inserts 500 have an outer diameter that is less than the inner diameter of the compartment 27. In an embodiment, the food items are placed on the pointed members 502 of the inserts 500, and the inserts 500 are inserted into the compartment 27 of the container 12 in a stacked arrangement. The cooking basket 10 with the stacked inserts 500 may then be used with a cooking vessel such as an oven or grill as described above.

It should be understood that the embodiments described herein are merely exemplary and that a person skilled in the art may make many variations and modifications without departing from the spirit and scope of the invention. All such variations and modifications are intended to be included within the scope of the invention.

What is claimed is:

1. A cooking apparatus, comprising:
   a container having a first end, a second end opposite the first end, a sidewall extending from the first end to the second end, an opening located that the first end, an end wall located at the second end, and a cap removably attached to the first end,
   wherein the sidewall and the end wall form a compartment that is sized and shaped to receive at least one first food item,
   wherein the sidewall includes a wire mesh having a plurality of wires,
   wherein each of the plurality of wires includes a circular-shaped cross-section,
   wherein each of the plurality of wires includes a diameter of 0.028 inch,
   wherein each of the plurality of wires includes a first plurality of wires, each of which extends longitudinally from the first end to the second end, and a second plurality of wires, each of which extends circumferentially and extends perpendicular to the first plurality of wires, and
   wherein each of the first plurality of wires is spaced apart from one another by 0.25 inch, and wherein each of the second plurality of wires is spaced apart from one another by 0.25 inch.

2. The cooking apparatus of claim 1, wherein the container is cylindrical in shape.

3. The cooking apparatus of claim 2, wherein the first plurality of wires and the second plurality of wires form a plurality of openings.

4. The cooking apparatus of claim 3, wherein each of the plurality of openings includes a shape selected from the group consisting of square, diamond, hexagonal, circular, and rectangular.

5. The cooking apparatus of claim 1, wherein the plurality of wires is made from a material selected from the group consisting of stainless steel, 304 stainless steel, 309 stainless steel, 316 stainless steel, and carbon steel.

6. The cooking apparatus of claim 1, wherein the plurality of wires includes a non-stick coating.

7. The cooking apparatus of claim 2, wherein the end wall includes a wire mesh having a plurality of wires, wherein each of the plurality of wires of the end wall includes a diameter in a range of 0.011 inch to 0.25 inch.

8. The cooking apparatus of claim 7, wherein the cap includes a wire mesh having a plurality of wires, wherein each of the plurality of wires of the cap includes a diameter in a range of 0.011 inch to 0.25 inch.

9. The cooking apparatus of claim 8, wherein the cap includes a top wall and a sidewall extending from the top wall.

10. The cooking apparatus of claim 9, wherein the container includes a first band circumferentially extending at the first end thereof and a second band circumferentially extending at the second end thereof, wherein the sidewall of the cap includes a third band circumferentially extending at a free end thereof, and wherein the third band of the cap is adapted to frictionally engage the second band of the container.

11. The cooking apparatus of claim 10, wherein the container includes a fourth band extending longitudinally from the first band to the second band.

12. The cooking apparatus of claim 1, further comprising a food cage having a first portion and a second portion attached removably to the first portion, each of the first portion and the second portion includes a flat mesh surface having a first end, a second end opposite the first end of the flat mesh surface, and a pair of opposing side bands extending outwardly from the flat mesh surface and extending from the first end of the flat mesh surface to the second end of the flat mesh surface, wherein the first portion and the second portion form a second compartment adapted to receive at least one second food item, and wherein the food cage is adapted to be removably inserted within the compartment of the container, and wherein the at least one first food item is adapted to be positioned between the sidewall of the container and one of the flat mesh surfaces of the first portion and the second portion.

13. The cooking apparatus of claim 12, wherein each of the flat mesh surfaces includes a plurality of wires.

14. The cooking apparatus of claim 13, wherein each of the flat mesh surfaces is rectangular in shape.

15. The cooking apparatus of claim 1, further comprising a grill plate having a first surface and a second surface opposite the first surface, wherein the grill plate is adapted to be removably inserted within the compartment of the container, and wherein the at least one food item is adapted to be positioned on one of the first surface and the second surface.

16. The cooking apparatus of claim 1, further comprising a cylinder having a first end, a second end opposite the first end of the cylinder, a wall extending from the first end of the cylinder to the second end of the cylinder, an interior portion extending from the first end of the cylinder to the second end of the cylinder, and a plurality of holes extending through the wall and in fluid communication with the interior portion, wherein the cylinder is adapted to be removably inserted within the compartment of the container, and wherein the at least one food item is adapted to be positioned intermediate the sidewall of the compartment and the wall of the cylinder.

17. The cooking apparatus of claim 1, further comprising a plurality of heating inserts, each of which includes central portion and a plurality of elongated pointed members extending from the central portion, wherein each of the plurality of elongated pointed members is adapted to pierce and receive at least one of the at least one food item, wherein the plurality of heating inserts is adapted to be removably inserted within the compartment of the container.

18. The cooking apparatus of claim 1, wherein the cooking apparatus includes an outer diameter in a range of 3 inches to 8 inches, and a length in a range of 6 inches to 18 inches.

19. A cooking apparatus, comprising:
a container having a first end, a second end opposite the first end, a sidewall extending from the first end to the second end, an opening located that the first end, an end wall located at the second end, and a cap removably attached to the first end,
wherein the sidewall and the end wall form a compartment,
wherein the sidewall includes a wire mesh having a plurality of wires,
wherein each of the plurality of wires includes a circular-shaped cross-section,
wherein each of the plurality of wires includes a diameter of about 0.028 inch,
wherein each of the plurality of wires includes a first plurality of wires, each of which extends longitudinally from the first end to the second end, and a second plurality of wires, each of which extends circumferentially and extends perpendicular to the first plurality of wires, and
wherein each of the first plurality of wires is spaced apart from one another by about 0.25 inch, and wherein each of the second plurality of wires is spaced apart from one another by about 0.25 inch.

* * * * *